(12) United States Patent
Meszaros (10) Patent No.: US 12,483,614 B2
(45) Date of Patent: Nov. 25, 2025

(54) ADAPTIVE PLAYBACK SPEED OF A MEDIA STREAM BASED ON SYSTEM RESOURCES (71) Applicant: Red Hat, Inc., Raleigh, NC (US)

(72) Inventor: Tomas Meszaros, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/442,997

(22) Filed: Feb. 15, 2024

(65) Prior Publication Data
US 2025/0267181 A1 Aug. 21, 2025

(51) Int. Cl.
*G06F 15/16* (2006.01)
*H04L 65/75* (2022.01)
*H04L 65/752* (2022.01)
*H04L 65/756* (2022.01)

(52) U.S. Cl.
CPC .......... *H04L 65/756* (2022.05); *H04L 65/752* (2022.05); *H04L 65/764* (2022.05)

(58) Field of Classification Search
CPC .... H04L 65/756; H04L 65/752; H04L 65/764
See application file for complete search history.

(56) References Cited

U.S. PATENT DOCUMENTS

| | | | | |
|---|---|---|---|---|
| 5,583,561 A * | 12/1996 | Baker | ...................... | H04L 65/70 709/219 |
| 5,712,976 A * | 1/1998 | Falcon, Jr. | ............ | G06F 3/0601 725/115 |
| 11,558,664 B1 * | 1/2023 | Desai | ...................... | H04R 1/326 |
| 11,757,961 B2 * | 9/2023 | Shribman | .......... | H04N 21/6125 709/219 |
| 2012/0005365 A1 * | 1/2012 | Ma | .......................... | H04L 65/70 709/231 |
| 2015/0026309 A1 * | 1/2015 | Radcliffe | ............... | H04L 65/752 709/219 |
| 2015/0110474 A1 * | 4/2015 | Chen | ..................... | H04L 65/756 386/345 |
| 2016/0366202 A1 * | 12/2016 | Phillips | ............ | H04N 21/26258 |
| 2019/0036823 A1 * | 1/2019 | Voris | ..................... | H04L 65/752 |
| 2020/0206619 A1 * | 7/2020 | van der Laan | .... | H04N 21/4307 |
| 2021/0314377 A1 * | 10/2021 | Shribman | .......... | H04N 21/8456 |
| 2022/0272397 A1 * | 8/2022 | Sturm | ................ | H04N 21/2402 |
| 2022/0385709 A1 * | 12/2022 | Ólafsson | ............ | H04N 21/6587 |

* cited by examiner

*Primary Examiner* — Razu A Miah
(74) *Attorney, Agent, or Firm* — Kilpatrick Townsend & Stockton LLP (57) ABSTRACT

A media playback system can be used to implement adaptive playback speed of a media stream based on an availability of system resources. In some aspects, the media playback system can apply a set playback speed as a rate at which the media stream is presented to a user. In response to applying the set playback speed to the media stream, the media playback system can determine that one or more interruptions of the media stream are occurring at the set playback speed. In response, the media playback system can adjust the set playback speed to a reduced playback speed to resolve the interruptions. Subsequently, the media playback system can adjust the reduced playback speed to an increased playback speed. The increased playback speed can be further adjusted based on whether the interruptions occur when the media stream is presented at the increased playback speed.

20 Claims, 4 Drawing Sheets

302
Apply a set playback speed as a rate at which a media stream is presented to a user

↓

304
Determine that one or more interruptions of the media stream are occurring at the set playback speed

↓

306
Adjust the set playback speed to a reduced playback speed to resolve the one or more interruptions

↓

308
Adjust the reduced playback speed to an increased playback speed

ADAPTIVE PLAYBACK SPEED OF A MEDIA STREAM BASED ON SYSTEM RESOURCES

TECHNICAL FIELD

The present disclosure relates generally to media playback. More specifically, but not by way of limitation, this disclosure relates to adjusting a playback speed of a media stream based on system resources.

BACKGROUND

Media streaming involves a client device connecting to a network including one or more servers used to store and stream media files, such as those used to encode and present movies, television shows, audiobooks, etc. The client device includes functions to adjust a playback speed of a media stream to speed up or slow down the presentation of a media file. The client device can receive user input generated by a user selecting a predefined playback speed via a user interface outputted by the client device.

The media files are typically divided into one or more segments that can be loaded by the client device for media streaming. Downloading individual portions of the segments to play a media stream can be referred to as buffering. Once the portion of the segments is loaded by the client device, the user can begin receiving the presentation of the media file prior to loading the entire media file. If a connection to the network is briefly interrupted, the client device can continue streaming the pre-loaded segments of the media file such that the presentation of the media file remains uninterrupted for the user.

DETAILED DESCRIPTION

Playing a media file, such as a digital video presentation from an Internet-based streaming service, involves loading one or more segments of the media file to display video, audio, or a combination thereof as a media stream. A media playback system can select a suitable version of the media file to download based on available system resources, such as bandwidth or processing power, to support the media stream. Each version of the media file can support a different bit rate with respect to data transfer. The media playback system can load one or more segments of the selected version of the media file as part of a buffering process before presenting the media stream to the user.

Before or while the media playback system presents the media stream to the user, the user can define a set playback speed of the media stream. If the set playback speed causes the media playback system to play the loaded segments faster than the buffering process can load remaining segments of the media file, the user can experience continual interruptions of the media stream. As a result, the user may become frustrated by delays in playing the media file and may manually adjust one or more parameters (e.g., playback speed, video resolution, etc.) associated with playing the media file. But these actions can be disruptive of the user's experience when viewing or listening to the media stream. In some cases, if the media playback system detects one or more interruptions to playing the media file due to a lack of system resources, the media playback system can downgrade to a different version of the media file associated with a relatively low bit rate. But lowering the bit rate of the media file typically reduces the quality of the media stream, such as a resolution of a video, thereby adversely affecting the user's experience of the media stream.

Some examples of the present disclosure can overcome one or more of the issues mentioned above by adjusting a playback speed of a media stream based on system resources. A media playback system can receive user input indicating a set playback speed at which to present the media stream to the user. Presenting the media stream at the set playback speed may consume more system resources compared to presenting the media stream at a default playback speed. In some cases, the media stream may experience one or more interruptions (e.g., stop intermittently) due to a lack of system resources to support a current bit rate associated with the media file being played to generate the media stream. Based on the interruptions, the media playback system can modify the playback speed of the media stream to resolve the interruptions of the media stream while maintaining the current bit rate used to provide the media stream to the user. Accordingly, by implementing an adaptive playback speed with respect to the media stream, the media playback system can facilitate continuous streaming of the media stream despite fluctuations in an availability of system resources.

In one particular example, a user may select video content to watch and listen to by interacting with the media playback system. Based on the video content selected by the user, the media playback system can request one or more media files associated with the video content from a streaming server that can store one or more versions of the media files. The media files can include audio files, video files, or a combination thereof. Each version of the media files can correspond to a different quality level, such as different resolution levels. After downloading at least a portion of the media files, the media playback system can initiate a media stream based on the media files to present the video content to the user at a default playback speed. For instance, the media playback system may include instructions to decode the downloaded media files to output audio via a speaker based on audio files and to output suitable pixels via a user interface based on video files.

While the video content is being presented to the user, the user may provide user input to increase the default playback speed of the media stream, such as by indicating a set playback speed that is faster than the default playback speed of the media stream. The set playback speed may cause the media stream to be presented to the user faster than the media playback system can download additional portions of the media files. Consequently, the media stream may stop playing until the media playback system can download the additional portions of the media files, resulting in delays associated with experiencing the video content. In other words, the media playback system may detect one or more interruptions in the media stream while presenting the media stream to the user at the set playback speed.

To resolve the interruptions in the media stream while maintaining the quality of the media stream, the media playback system can modify the playback speed of the media stream at a particular point in time, such as the set playback speed. Iteratively determining whether the media stream has stopped and performing a suitable adjustment to the playback speed can be referred to as adaptive playback speed. For example, the media playback system may modify the set playback speed by applying a reduction step to decrease the set playback speed. In other words, the media playback system can reduce the set playback speed to a reduced playback speed that is slower than the set playback speed. Once the media playback system applies the reduction step to the set playback speed, the media playback system may monitor the media stream to iteratively modify a current playback speed of the media stream based on one or more conditions. For instance, the media playback system may modify the current playback speed of the media stream based on whether the media stream is experiencing interruptions at the current playback speed. Additionally or alternatively, the media playback system can monitor the media stream to whether the current playback speed is lower than the set playback speed indicated by the user.

After applying the reduction step, the media playback system can determine whether the interruptions are still occurring in the media stream when the media stream is presented to the user at the reduced playback speed. If the media stream continues to have interruptions, the media playback system can further reduce the reduced playback speed by iteratively applying the reduction step until the media stream is continuously presented (e.g., without interruptions) to the user. On the other hand, if the media stream is continuously presented to the user at the reduced playback speed, the media playback system can check whether the reduced playback speed is lower than the set playback speed. If the reduced playback speed is lower than the set playback speed, the media playback system can increase the reduced playback speed by applying an increase step to the reduced playback speed. Conversely, if the reduced playback speed is higher than or the same as the set playback speed, the media playback system can continue to present the media stream to the user at the reduced playback speed.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
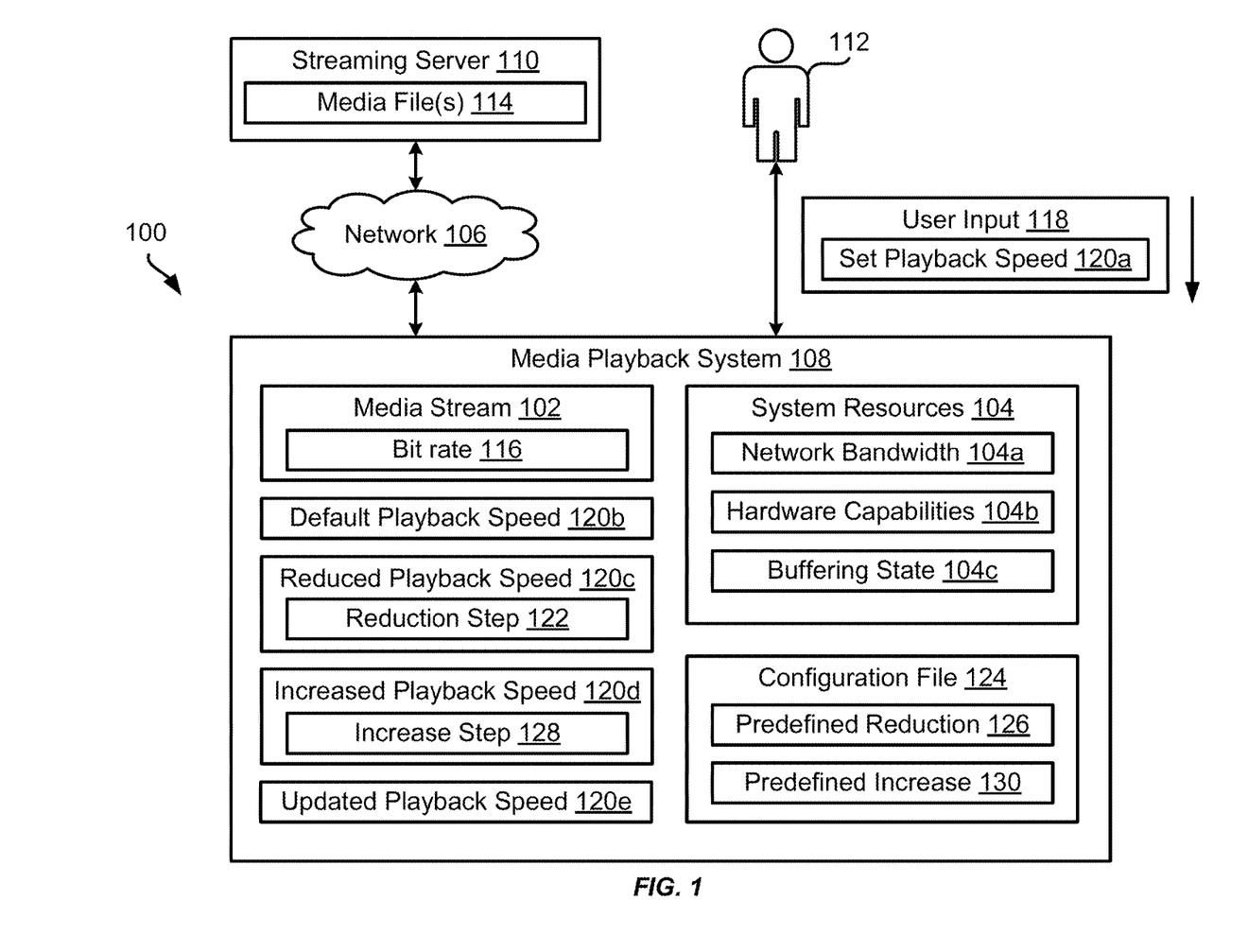
FIG. 1 is a block diagram of an example of a computing environment for adaptive playback speed of a media stream based on system resources according to some aspects of the present disclosure.

FIG. 1 is a block diagram of an example of a computing environment 100 for adaptive playback speed of a media stream 102 based on system resources 104 according to some aspects of the present disclosure. Components within the computing environment 100 may be communicatively coupled via a network 106, such as a local area network (LAN), wide area network (WAN), the Internet, or any combination thereof. For example, the computing environment 100 can include a media playback system 108 and a streaming server 110 that are communicatively coupled through the network 106. In some examples, the media playback system can include a computing device, such as a desktop computer, laptop computer, server, mobile phone, or tablet. Through the network 106, the media playback system 108 can receive source content from the streaming server 110 that is associated with digital media that the media playback system 108 can present to a user 112 as a media stream 102. Presenting the media stream 102 to the user 112 can involve providing the digital media for display, listening, or other suitable consumption by the user 112. The media stream 102 can include audio content, video content, or a combination thereof. Examples of the digital media can include audiobooks, podcasts, webcasts, television shows, video games, online videos, etc.

In some cases, the media playback system 108 may receive the source content as one or more media files 114 hosted by a computing system, such as the streaming server 110, that can be separate from the media playback system 108. For example, the streaming server 110 can be remote from the media playback system 108 such that the streaming server 110 and the media playback system 108 may be physically positioned in separate locations. Generating the media files 114 of the source content can involve creating multiple versions of the source content that can be encoded based on compatibility with different system resources, such as bandwidth. For example, an encoder can encode the source content at multiple bit rates to generate the media files 114 of the source content. Each bit rate can support a different amount of data used to represent the source content such that a higher bit rate can provide a media stream with a higher quality compared to a lower bit rate. When obtaining the media files 114 from the streaming server 110, the media playback system 108 can select a suitable version of the source content based on a current availability of the system resources 104. In other words, the media playback system 108 can select a particular media file stored in the streaming server 110 to provide a media stream 102 of the source content with a suitable quality level based on the system resources 104 that are currently available.

The quality level of the media stream 102 can affect an amount of system resources 104 (e.g., processing power, memory, network bandwidth 104a, etc.) used by the media playback system 108 to present the media stream 102 to the user 112. For example, the quality level of a video can correspond to a resolution used to present the video to the user 112. Providing the video at a higher resolution (e.g., 4K resolution) can require more system resources 104, such as the network bandwidth 104a, compared to providing the video at a lower resolution, such as 1440p. As an illustrative example, 4K resolution can include approximately 4000 pixels in width, whereas 1440p typically includes approximately 2560 pixels in width. Consequently, providing the video using 4K resolution can require larger amounts of data transfer compared to providing the video in 1440$p$ resolution, thereby resulting in a higher consumption of the system resources 104.

To present the media stream 102 to the user 112, the media playback system 108 can retrieve (e.g., download or request) the media files 114 from the streaming server 110 via the network 106. After the user 112 initiates the media stream 102, the media playback system 108 can initially request the lowest quality level available with respect to the media files 114. If the availability of the system resources 104 changes, the media playback system 108 can adjust a bit rate 116 associated with the media stream 102 by selecting a different version of the media stream 102 to provide to the user 112. For example, the media playback system 108 may detect that a throughput of the network 106 is greater than a bit rate 116 corresponding to the media stream 102. Accordingly, the media playback system 108 can transmit a request to the streaming server 110 to obtain suitable media files corresponding to a different media stream that has a higher bit rate.

Each encoding of the source content can be divided into one or more segments (e.g., one or more multi-second sections). In some examples, the media playback system 108 can continually download a portion of the segments, rather than downloading the entire media file 114 at once. For example, the media playback system 108 may store the portion of the segments in a memory buffer (e.g., random access memory (RAM)). Once the portion of the segments is downloaded, the media playback system 108 can load the portion of the segments to present a corresponding subset of the source content to the user 112 while continuing to download additional portions of the segments. This process can be referred to as buffering. Delays in presenting the media stream 102 to the user 112 can occur if the media playback system 108 lacks the system resources 104 to download the additional portions of the segments faster than the media stream 102 is presented. For example, based on the system resources 104 that are available, the media playback system 108 may download an additional portion of the segments in a minute. If the media stream 102 reaches a buffering point after 30 seconds when presented at a playback speed of 2× speed, the user 112 may continue to experience interruptions if the availability of the system resources 104 remains the same.

In some cases, the user 112 may provide user input 118 to the media playback system 108 adjust a playback speed 120 corresponding to the media stream 102. For example, the user input 118 can indicate a set playback speed 120a of the media stream 102. The user 112 may interact with a user interface outputted by the media playback system 108 to update a current playback speed of the media stream 102 to the set playback speed 120a. In some examples, the current playback speed of the media stream 102 may be a default playback speed 120b of the media playback system 108. In some implementations, the user 112 may provide a set playback speed 120a that is faster than the default playback speed 120b to experience the media stream 102 using less time compared to the default playback speed 120b. For example, the user 112 can consume thirty minutes of video content in fifteen minutes when the video content is presented at a set playback speed 120a of 2× speed that is twice as fast as a default playback speed 120b of 1× speed. In other implementations, the user 112 can slow down the media stream 102 by indicating a set playback speed 120a that is slower than the default playback speed 120b. For example, if the user 112 has difficulty understanding an audiobook when played at the default playback speed 120b, the user 112 can indicate the set playback speed 120a to decrease the default playback speed 120b. Adjusting the default playback speed 120b may affect an audio pitch of the media stream 102. Typically, the quality level of the media stream 102 can remain unaffected if the default playback speed 120b is modified.

In some examples, the user 112 may indicate the set playback speed 120a while the media stream 102 is being presented to the user 112, such as while an audiobook is playing. For example, the user can interact with the user interface to indicate a set playback speed 120a to replace the current playback speed of an audiobook while the audiobook is playing. In other examples, the user 112 may select or input the set playback speed 120a when the media stream 102 is not playing, such as prior to starting to play the media stream 102 or while the media stream 102 is paused.

The set playback speed 120a may be faster or slower than the current playback speed of the media stream 102. Increasing the current playback speed of the media stream 102 can result in an increased consumption of the system resources 104 used by the media playback system 108 to present the media stream 102 to the user 112. In some examples, one or more interruptions may occur in the media stream 102 being presented at the set playback speed 120a, such as due to a lack of system resources 104 to continue presenting the media stream 102 using the set playback speed 120a. The media playback system 108 can differentiate between interruptions affecting the media stream 102 and pauses caused by the user 112 (e.g., by providing user input 118 to temporarily stop the media stream 102). For example, the media playback system 108 may monitor a progress of the media stream 102 to determine whether the media stream 102 is experiencing interruptions. When monitoring the media stream 102, the media playback system 108 can check the progress of the media stream 102 at one or more intervals to determine whether the progress has increased as expected based on a comparison with an expected value. If the progress is less than the expected value, the media playback system 108 can determine that the media stream 102 has stopped and for how long the media stream 102 has stopped. Additionally, the media playback system 108 can determine whether the user 112 has provided the user input 118 to pause the media stream 102. Accordingly, the media playback system 108 can confirm whether the media stream 102 has stopped due to interruptions caused by the lack of system resources 104 or due to the user input 118.

In some implementations, if the media stream 102 is being continuously presented to the user 112, the media playback system 108 may continue to present the media stream 102 to the user 112 at the set playback speed 120a. In other implementations, if the media playback system 108 detects the interruptions in the media stream 102, the media playback system 108 can implement a reduced playback speed 120c to resolve the interruptions. The reduced playback speed 120c can refer to a playback speed that is slower than the set playback speed 120a. The media playback system 108 can generate the reduced playback speed 120c by applying at least one reduction step 122 to the set playback speed 120a. In some examples, prior to implementing the reduced playback speed 120c, the media playback system 108 can determine whether the set playback speed 120a is lower than the default playback speed 120b associated with the media stream 102. For example, by default, the media playback system 108 may present the media stream 102 at 1× speed as the default playback speed 120b. The default playback speed 120b can correspond to how media content provided in the media stream 102 was created. For example, when a podcast is presented at the default playback speed 120b, the user 112 can listen to the podcast based on a speech tempo of a podcast creator as recorded. Slowing the playback speed 120 past the default playback speed 120b can adversely affect the user's experience of the media stream 102. As a result, the media playback system 108 may avoid decreasing the playback speed 120 of the media stream 102 to below the default playback speed 120b.

If the set playback speed 120a is equal to or lower than the default playback speed 120b, the media playback system 108 can adjust the bit rate 116 of the media stream 102 to resolve the interruptions of the media stream 102. As described above, adjusting the bit rate 116 of the media stream 102 can modify an amount of the system resources 104 used to present the media stream 102 to the user 112, thereby affecting the quality level of the media stream 102.

For example, the media playback system 108 can decrease the bit rate 116 by selecting the media files 114 from the streaming server 110 that correspond to another version of the source content that is encoded for a lower bit rate. By decreasing the bit rate 116, the media playback system 108 can reduce the system resources 104 used to present the media stream 102 to the user 112. This process of adjusting the bit rate 116 can be referred to as adaptive bit rate streaming.

In examples in which the set playback speed 120*a* is higher or faster than the default playback speed 120*b*, the media playback system 108 can apply the reduction step 122 to the set playback speed 120*a*. The media playback system 108 may obtain the reduction step 122 from a configuration file 124 of the media playback system 108 that can indicate a predefined reduction 126 corresponding to the reduction step 122. For example, the media playback system 108 can read the configuration file 124 to determine that the set playback speed 120*a* is to be reduced by a predefined reduction 126 of 0.25× speed. The predefined reduction 126 may vary based on whether the reduction step 122 is being applied to a set playback speed 120*a* indicated by the user 112. For example, the predefined reduction 126 may have a different value (e.g., a higher value or a lower value) if the reduction step 122 is being applied to the set playback speed 120*a* compared to another playback speed that has already been modified. In other examples, the media playback system 108 may determine the reduction step 122 based on the system resources 104 that are available to present the media stream 102 to the user 112.

Examples of the system resources 104 can include the network bandwidth 104*a*, hardware capabilities 104*b* associated with the media playback system 108, a buffering state 104*c*, or a combination thereof. In some cases, the network bandwidth 104*a* can correspond to a maximum rate of data transfer between the media playback system 108 and the streaming server 110 via the network 106. Additionally or alternatively, the network bandwidth 104*a* can indicate an average rate of successful data transfer between the media playback system 108 and the streaming server 110. The hardware capabilities 104*b* of the media playback system 108 can correspond to a utilization of hardware components such as a central processing unit (CPU), a graphics processing unit (GPU), data storage, random access memory (RAM), etc. The buffering state 104*c* can indicate how much (e.g., a percentage) of the segments has already been buffered (e.g., downloaded). The media playback system 108 can present the segments that have already been buffered to the user 112 without interruptions.

Once the media playback system 108 has applied the reduction step 122 to the set playback speed 120*a*, the media playback system 108 can monitor the media stream 102 while presenting the media stream 102 to the user 112 at the reduced playback speed 120*c*. In some cases, the media playback system 108 may determine that the interruptions in the media stream 102 are ongoing, such as based on the media stream 102 having stopped at least once when presented at the reduced playback speed 120*c*. To resolve the interruptions, the media playback system 108 can iteratively reduce the playback speed 120 of the media stream 102 by applying the reduction step 122 to modify the reduced playback speed 120*c* to resolve the interruptions. The playback speed 120 can refer to a current playback speed of the media stream 102, such as after applying the reduction step 122 to the reduced playback speed 120*c*. The media playback system 108 may iteratively reduce the playback speed 120 of the media stream 102 until the interruptions are resolved or until the playback speed 120 is equal to the default playback speed 120*b*. The playback speed 120 can update with each iteration to reflect the current playback speed. For example, after each iteration of applying the reduction step 122, the media playback system 108 can check whether the interruptions have been resolved to determine whether to continue reducing the playback speed 120. Additionally, the media playback system 108 can compare the playback speed 120 to the default playback speed 120*b* after each iteration of applying the reduction step 122 to avoid reducing the playback speed 120 lower than the default playback speed 120*b*. In some implementations, the media playback system 108 may reduce the reduced playback speed 120*c* by the predefined reduction 126 used to decrease the set playback speed 120*a* to the reduced playback speed 120*c*. In other implementations, the reduction step 122 applied at each iteration may be determined by the media playback system 108 based on the system resources 104 that are available at a corresponding point in time.

In some examples, the media playback system 108 may determine that presenting the media stream 102 at the reduced playback speed 120*c* resolves the interruptions of the media stream 102. The media playback system 108 then can compare the reduced playback speed 120*c* to the set playback speed 120*a* to determine whether to increase the reduced playback speed 120*c*. In some cases, the media playback system 108 may compare the reduced playback speed 120*c* to the set playback speed 120*a* after a predefined time window has passed. For example, the media playback system 108 can confirm that the media stream 102 has been uninterrupted for at least one minute when presented at the reduced playback speed 120*c* before comparing the reduced playback speed 120*c*. In any case, if the media playback system 108 determines that the reduced playback speed 120*c* is lower than the set playback speed 120*a*, the media playback system 108 can increase the reduced playback speed 120*c*. For example, the media playback system 108 can apply at least one increase step 128 to the reduced playback speed 120*c* to present the media stream 102 at an increased playback speed 120*d*. In some cases, the increased playback speed 120*d* may be faster than the reduced playback speed 120*c* while being slower than the set playback speed 120*a*. Consequently, the media playback system 108 may apply at least one additional increase step to modify the increased playback speed 120*d* of the media stream 102 to match the set playback speed 120*a*.

Similar to the reduction step 122 described above, the media playback system 108 can obtain the increase step 128 from the configuration file 124 or based on the system resources 104 that are available. For example, the configuration file 124 may indicate a predefined increase 130 corresponding to the increase step 128 to increase the reduced playback speed 120*c*. As another example, the media playback system 108 can determine the increase step 128 by implementing a calculation process that accounts for the system resources 104 as variables that affect a magnitude of the increase step 128. A respective impact of each system resource on the magnitude of the increase step 128 may be different such that the calculation process may assign a different weight to each system resource when determining the increase step 128. For example, the network bandwidth 104*a* may have a greater impact on how much the reduced playback speed 120*c* is increased compared to CPU usage. The calculation process described above with respect to determining the increase step 128 similarly can be implemented to determine the reduction step 122.

The media playback system 108 can adjust the increased playback speed 120d based on whether the media stream 102 is continuously presented to the user 112 at the increased playback speed 120d. In some examples, increasing the reduced playback speed 120c can cause the media stream 102 to stop for buffering (e.g., to load additional segments of the media files 114). For example, the media playback system 108 may have insufficient system resources to continuously present the media stream 102 to the user 112 at the increased playback speed 120d. Consequently, the media playback system 108 may reduce the increased playback speed 120d to resolve the interruptions to the media stream 102. For example, the media playback system 108 can revert the increased playback speed 120d to the reduced playback speed 120c, such as by applying a reduction step 122 that is equal in magnitude to the increase step 128. As another example, the media playback system 108 may reduce the increased playback speed 120d by a reduction step 122 determined based on an availability of the system resources 104 at a current time. Accordingly, the reduction step 122 may be greater than or less than in magnitude compared to the increase step 128.

Additionally, the media playback system 108 can adjust the increased playback speed 120d based on whether the increased playback speed 120d is lower than the set playback speed 120a. In some examples, if the media playback system 108 determines that the increased playback speed 120d is lower than the set playback speed 120a, the media playback system 108 can further increase the increased playback speed 120d. For example, the media playback system 108 can apply an increase step 128 to the increased playback speed 120d to present the media stream 102 to the user 112 at an updated playback speed 120e. Once the media playback system 108 is presenting the media stream 102 at the updated playback speed 120e, the media playback system 108 can determine whether the media stream 102 is experiencing interruptions. If the media playback system 108 detects that the interruptions are present and caused by a lack of the system resources 104, the media playback system 108 can decrease the updated playback speed 120e to resolve the interruptions.

In other examples, the media playback system 108 can determine that the increased playback speed 120d is equal to or higher than the set playback speed 120a. Consequently, the media playback system 108 can forgo an adjustment (e.g., applying the reduction step 122 or increase step 128) to the increased playback speed 120d. In some cases, the set playback speed 120a can function as a playback speed threshold such that increases to the increased playback speed 120d are determined by the media playback system 108 to meet but not exceed the set playback speed 120a.

While FIG. 1 depicts a specific arrangement of components, other examples can include more components, fewer components, different components, or a different arrangement of the components shown in FIG. 1. For instance, in other examples, the media playback system 108 may be communicatively coupled via the network 106 with more than one streaming server to stream different types of media content. Each streaming server may host a respective type of media content. Additionally, any component or combination of components depicted in FIG. 1 can be used to implement the process(es) described herein. As described herein, the playback speed 120 can refer to any suitable playback speed of the media stream 102 during an adaptive playback speed process. For example, the playback speed 120 may refer to the set playback speed 120a, the default playback speed 120b, the reduced playback speed 120c, the increased playback speed 120d, or the updated playback speed 120e.

Figure 2:
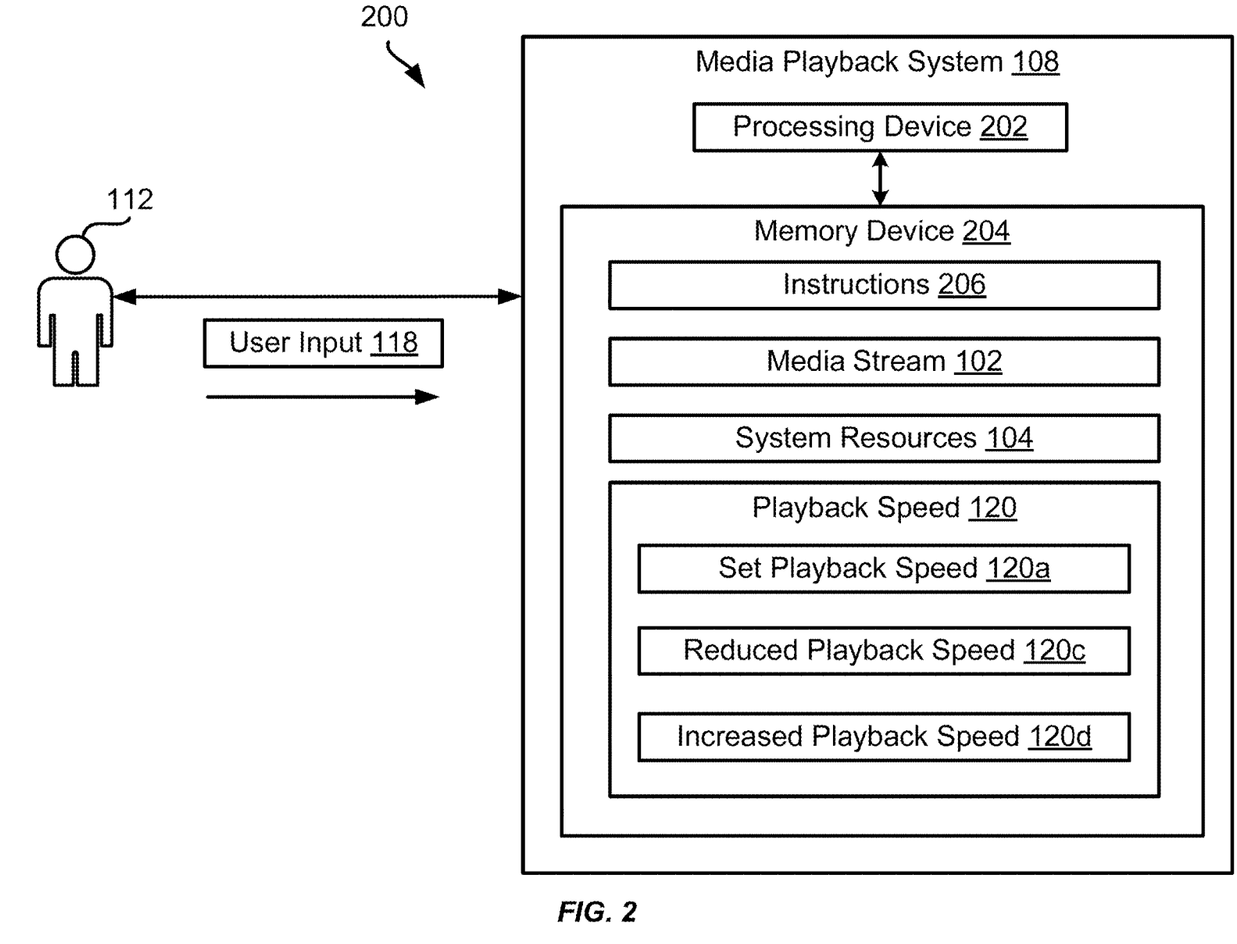
FIG. 2 is a block diagram of another example of a computing environment for adaptive playback speed of a media stream based on system resources according to some aspects of the present disclosure.

FIG. 2 is a block diagram of another example of a computing environment 200 for adaptive playback speed of a media stream 102 based on system resources 104 according to some aspects of the present disclosure. The computing environment 200 can include a processing device 202 communicatively coupled to a memory device 204. In some examples, the computing environment 200 may include additional components not pictured in FIG. 2, such as an input device, an output device, etc.

The processing device 202 can include one processing device or multiple processing devices. The processing device 202 can be referred to as a processor. Non-limiting examples of the processing device 202 include a Field-Programmable Gate Array (FPGA), an application-specific integrated circuit (ASIC), and a microprocessor. The processing device 202 can execute instructions 206 stored in the memory device 204 to perform operations. In some examples, the instructions 206 can include processor-specific instructions generated by a compiler or an interpreter from code written in any suitable computer-programming language, such as C, C++, C#, Java, Python, or any combination of these.

The memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. At least some of the memory device 204 includes a non-transitory computer-readable medium from which the processing device 202 can read instructions 206. A computer-readable medium can include electronic, optical, magnetic, or other storage devices capable of providing the processing device 202 with the instructions 206 or other program code. Non-limiting examples of a computer-readable medium include magnetic disk(s), memory chip(s), ROM, random-access memory (RAM), an ASIC, a configured processor, and optical storage.

In some examples, the processing device 202 can implement an adaptive playback speed technique to adjust a playback speed 120 at which a media stream 102 is presented to a user 112. The adaptive playback speed technique can involve adjusting the playback speed 120 of the media stream 102 based on system resources 104 that are available at a particular point in time. Presenting the media stream 102 to the user 112 can involve loading a media file 114 that has been divided into one or more portions. Once a particular portion of the media file 104 has been loaded, the processing device 202 can begin presenting the media stream 102 based on the particular portion of the media file 114. The processing device 202 can receive a set playback speed 120a provided by the user 112, such as via an input/output device (e.g., a keyboard, a mouse, a touchscreen, etc.).

After receiving the set playback speed 120a, the processing device 202 can apply the set playback speed 120a to the media stream 102. Once the media stream 102 is being presented to the user 112 at the set playback speed 120a, the processing device 202 can determine whether one or more interruptions of the media stream 102 are occurring at the set playback speed 120a. For example, the processing device 202 can detect that the media stream 102 has stopped to allow for a buffering process to load additional portions of the media file 114 to continue the media stream 102. In response to determining that the interruptions of the media stream 102 are occurring at the set playback speed 120a, the processing device 202 can adjust the set playback speed 120a to a reduced playback speed 120c to resolve the interruptions. After resolving the interruptions of the media stream 102, the processing device 202 can adjust the reduced playback speed 120c to an increased playback speed 120d. If the processing device 202 detects any interruptions to the media stream 102 when presenting the media stream 102 to the user 112 at the increased playback speed 120d, the processing device 202 can reduce the increased playback speed 120d. For example, the processing device 202 may revert the adjustment from the reduced playback speed 120c to the increased playback speed 120d until the system resources 104 can support the increased playback speed 120d.

Figure 3:
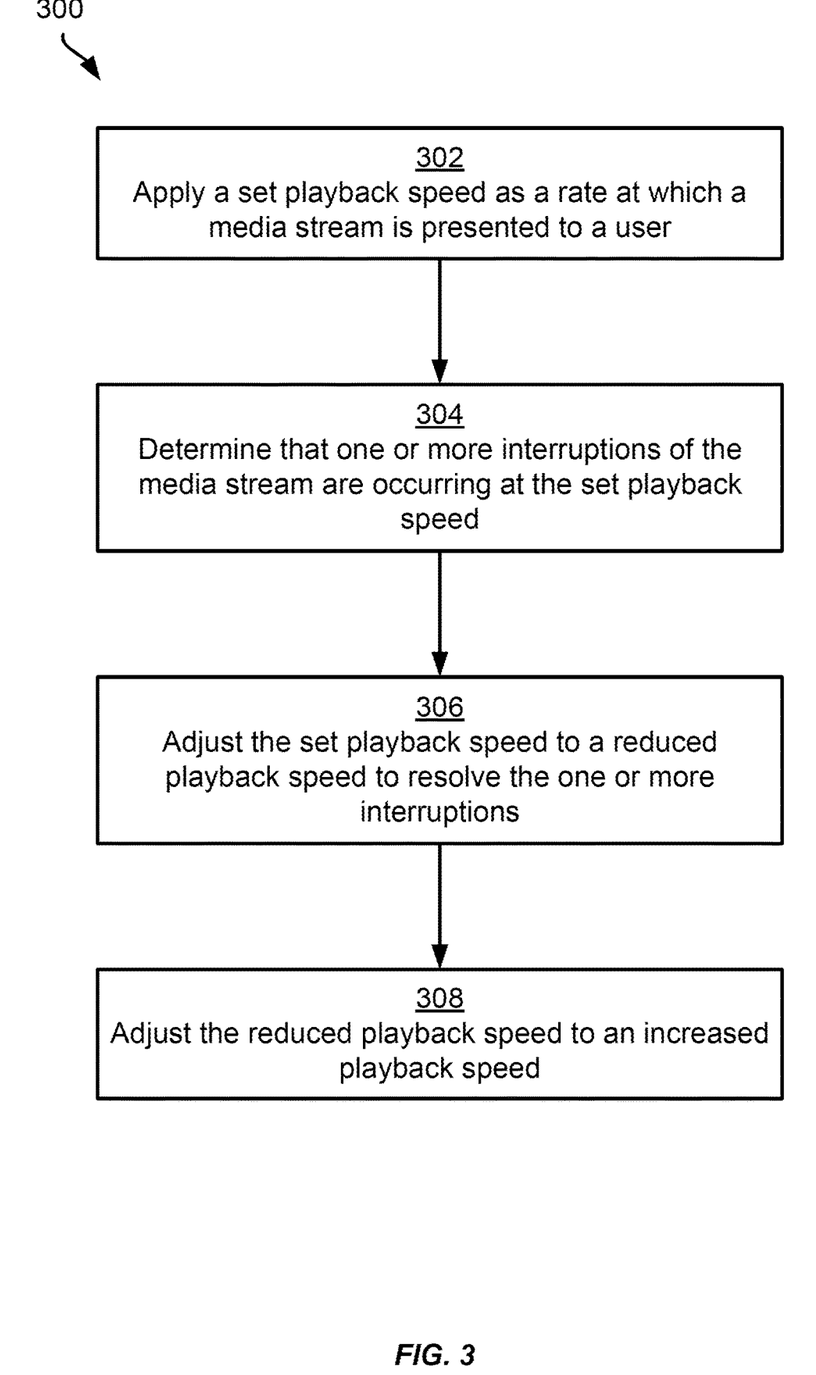
FIG. 3 is a flowchart of a process for adjusting a playback speed of a media stream based on system resources according to some aspects of the present disclosure.

FIG. 3 is a flowchart of a process 300 for adjusting a playback speed 120 of a media stream 102 based on system resources 104 according to some aspects of the present disclosure. In some examples, the processing device 202 can perform one or more of the steps shown in FIG. X. In other examples, the processing device 202 can implement more steps, fewer steps, different steps, or a different order of the steps depicted in FIG. 3. The steps of FIG. 3 are described below with reference to components discussed above in FIGS. 1-2.

In block 302, the processing device 202 applies a set playback speed 120a as a rate at which a media stream 102 is presented to a user 112. The processing device 202 can receive the set playback speed 120a as part of user input 118 generated by the user 112, for example by the user 112 interacting with an input device that can be communicatively coupled to the processing device 202. After determining the set playback speed 120a based on the user input 118, the processing device 202 can apply the set playback speed 120a to configure the rate at which the media stream 102 is presented to the user 112. In some examples, applying the set playback speed 120a may involve increasing or decreasing a default playback speed 120b (e.g., 1× speed) associated with the media stream 102. For example, the processing device 202 may apply a set playback speed 120a of 1.25× speed to increase the default playback speed 120b of 1× speed for an audiobook being presented to the user 112 using a mobile device.

In block 304, the processing device 202 determines that one or more interruptions of the media stream 102 are occurring at the set playback speed 120a. The interruptions can be caused by a lack of system resources 104 (e.g., network bandwidth 104a, hardware capabilities 104b, buffering state 104c, etc.). For example, the processing device 202 may detect that the media stream 102 has stopped at least once to enable a media file 114 corresponding to the media stream 102 to continue loading via a buffering process. In some cases, the processing device 202 can differentiate the interruptions of the media stream 102 that are caused by the lack of the system resources 104 from a pause of the media stream 102 initiated by the user 112. Continuing the example provided in block 302, the processing device 202 can detect that the user 112 has interacted with a user interface of the mobile device to pause the media stream 102 corresponding to the audiobook. As a result of determining that a particular interruption to the media stream 102 is initiated or related to the user 112, the processing device 202 can avoid modifying the set playback speed 120a based on the particular interruption.

In block 306, in response to determining that the one or more interruptions of the media stream 102 are occurring, the processing device 202 adjusts the set playback speed 120a to a reduced playback speed 120c to resolve the interruptions of the media stream 102. For example, if the processing device 202 determines that the audiobook has stopped to continue downloading the audiobook from a streaming server 110, the processing device 202 may apply a reduction step 122 to the 1.25× speed of the audiobook. In some examples, the processing device 202 may determine the reduction step 122 based on a predefined reduction 126 defined in a configuration file 124 accessible by the processing device 202. For example, the processing device 202 can obtain a predefined reduction 126 of 0.25× speed from the configuration file 124 and apply the predefined reduction 126 as the reduction step 122 to decrease the set playback speed 120a. Accordingly, the processing device 202 may apply the reduction step 122 to the set playback speed 120a of 1.25× speed to present the audiobook at a reduced playback speed 120c of 1× speed.

In other examples, the processing device 202 can determine the reduction step 122 by analyzing the system resources 104 that are available to support the media stream 102. For example, the processing device 202 may calculate the reduction step 122 based on an amount of the network bandwidth 104a that is available to download the media file 114 associated with the audiobook from the streaming server 110. As another example, the processing device 202 may provide a respective indication of the system resources 104 that are available to a machine-learning model trained to output the reduction step 122 based on an amount of available system resources.

In block 308, subsequent to resolving the one or more interruptions of the media stream 102, the processing device 202 adjusts the reduced playback speed 120c to an increased playback speed 120d. In some examples, the processing device 202 may apply an increase step 128 to the reduced playback speed 120c based on a predefined increase 130 to present the media stream 102 at the increased playback speed 120d. For example, the processing device 202 can read a configuration file 124 to identify a predefined increase 130 of 0.1× speed indicated in the configuration file 124 to modify the reduced playback speed 120c of 1× speed for the audiobook. After obtaining the predefined increase 130 from the configuration file 124, the processing device 202 can increase the reduced playback speed 120c by the predefined reduction 126 of 0.1× speed. In other examples, the processing device 202 can determine the increase step 128 based on an availability of the system resources 104 as described above with respect to determining the reduction step 122 in block 306.

In some examples, the processing device 202 can further adjust the increased playback speed 120d based on whether the one or more interruptions occur when the media stream 102 is presented at the increased playback speed 120d. For example, if the media stream 102 experiences interruptions while being presented at the increased playback speed 120d, the processing device 202 can reduce the increased playback speed 120d as described above with respect to block 306. As another example, if the media stream 102 is continuously presented to the user 112 at the increased playback speed 120d, the processing device 202 can continue providing the media stream 102 to the user 112 at the increased playback speed 120d. Additionally, if the increased playback speed 120d is lower than the set playback speed 120a, the processing device 202 can further increase the increased playback speed 120d (e.g., incrementally or at once) to match the set playback speed 120a. Additional details regarding adjusting the increased playback speed 120d are provided below with respect to FIG. 4.

Figure 4:
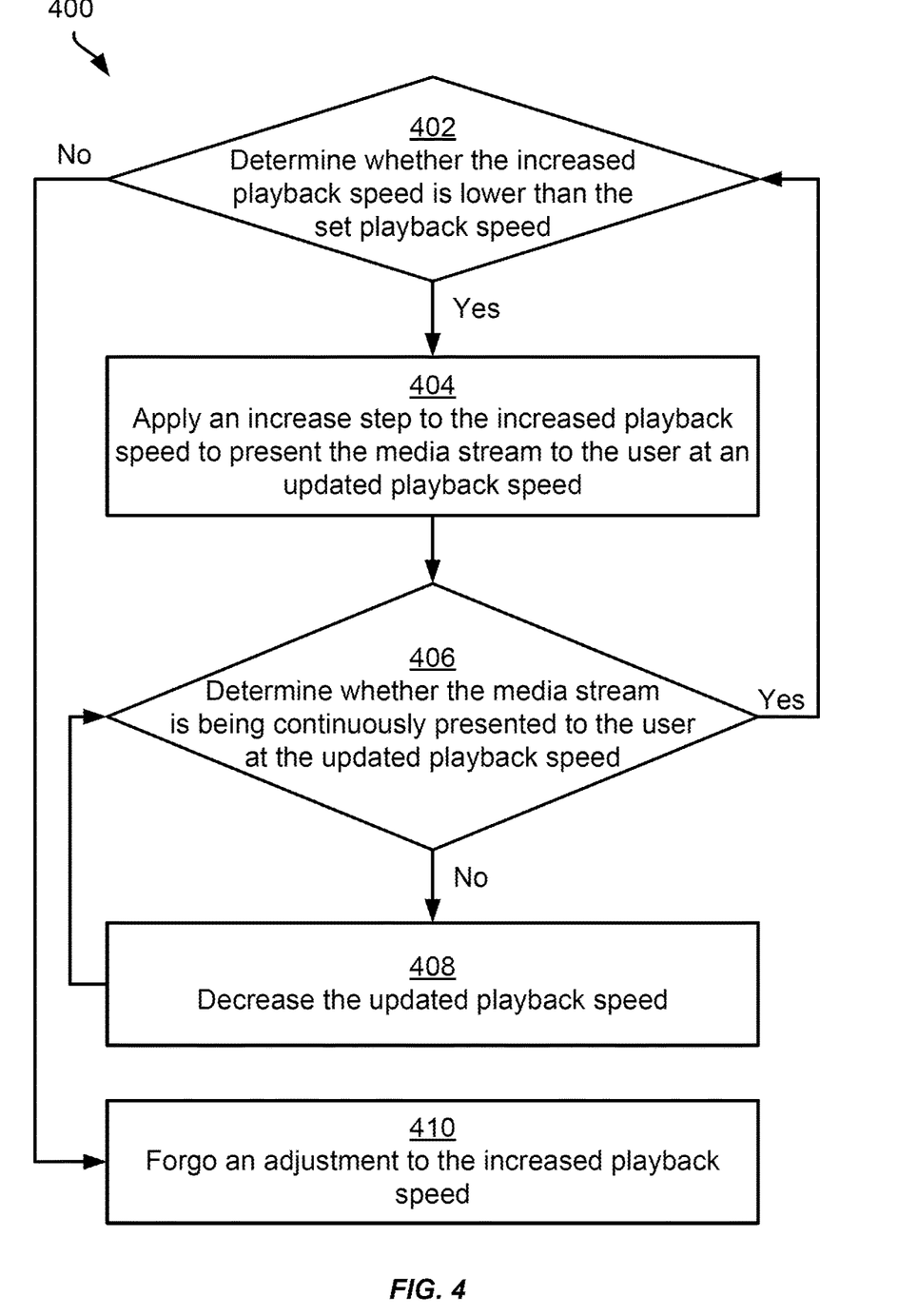
FIG. 4 is a flowchart of a process for adjusting an increased playback speed of a media stream based on system resources according to some aspects of the present disclosure.

FIG. 4 is a flowchart of a process 400 for adjusting an increased playback speed 120d of a media stream 102 based on system resources 104 according to some aspects of the present disclosure. In some examples, the processing device 202 can perform one or more of the steps shown in FIG. X. In other examples, the processing device 202 can implement more steps, fewer steps, different steps, or a different order of the steps depicted in FIG. 4. The steps of FIG. 4 are described below with reference to components discussed above in FIGS. 1-2. In some implementations, the steps of FIG. 4 can correspond to a continuation of the steps of FIG. 3 described above.

In block 402, the processing device 202 determines whether the increased playback speed 120d of the media stream 102 is lower than the set playback speed 120a. After determining that the increased playback speed 120d is lower than the set playback speed 120a, the processing device 202 can apply an increase step 128 to the increased playback speed 120d as described below with respect to block 404. On the other hand, if the increased playback speed 120d is equal to or higher than the set playback speed 120a, the processing device 202 can forgo an adjustment to the increased playback speed 120d as described below with respect to block 410. In other words, the process 400 may continue to block 404 if the processing device 202 determines that the increased playback speed 120d is lower than the set playback speed 120a or to block 410 if vice versa.

In block 404, in response to determining that the increased playback speed 120d is lower than the set playback speed 120a, the processing device 202 applies the increase step 128 to the increased playback speed 120d to present the media stream 102 to the user 112 at the updated playback speed 120d. For example, the increased playback speed 120d of 1.1× speed corresponding to the audiobook is slower than the set playback speed 120a of 1.25× speed. Consequently, the processing device 202 can modify the increased playback speed 120d of the audiobook to be closer to the set playback speed 120d. In some examples, the processing device 202 may determine the increase step 128 to apply to the increased playback speed 120d based on a predefined increase 130 defined in a configuration file 124. In other examples, the processing device 202 can determine the increase step 128 based on an availability of the system resources 104 used by the processing device 202 to present the media stream 102 at the updated playback speed 120d.

In block 406, subsequent to applying the increase step 128 to the increased playback speed 120d, the processing device 202 determines whether the media stream 102 is being continuously presented to the user 112 at the updated playback speed 120e. For example, the processing device 202 can determine if applying the increase step 128 causes the media stream 102 to experience interruptions related to insufficient system resources. If the processing device 202 determines that the media stream 102 is being continuously presented to the user 112 at the updated playback speed 120e, the process 400 can return to block 402 to compare the updated playback speed 120e with the set playback speed 120a. For example, if the updated playback speed 120e is lower than the set playback speed 120a, the processing device 202 can proceed to block 404 to further increase the updated playback speed 120e.

In block 408, the processing device 202 can decrease the updated playback speed 120e in response to detecting the interruptions of the media stream 102 caused by insufficient system resources. For example, the processing device 202 can apply a reduction step 122 determined based on the predefined reduction 126 indicated in the configuration file 124 or based on the system resources 104 that are available. After applying the reduction step 122, the processing device 202 may continue monitoring the media stream 102 to determine whether the reduction step 122 has resolved the interruptions of the media stream 102. If the interruptions have not been resolved, the processing device 202 can iteratively reduce the playback speed 120 of the media stream 102 until the interruptions are resolved. For example, the process 400 may loop between block 406 and block 408 until the interruptions of the media stream are resolved. If the reduction step 122 resolves the interruptions, process 400 can proceed to block 402 to modify the playback speed 120 to match the set playback speed 120a.

In block 410, in response to determining that the increased playback speed 120d is equal to or higher than the set playback speed 120a, the processing device 202 forgoes the adjustment to the increased playback speed 120d. In other words, the processing device 202 can continue to present the media stream 102 to the user 112 at the increased playback speed 120d if the increased playback speed 120d is equal to or higher than the set playback speed 120a. In some examples, after block 408, the process 400 can involve continuing to monitor the media stream 102 to determine whether the media stream 102 experiences interruptions at the increased playback speed 120d. For example, the processing device 202 can repeat the steps described above with respect to blocks 304, 306, and 308 in process 300 to adjust the increased playback speed 120d if the media stream 102 experiences interruptions. The processing device 202 can iteratively perform the steps of process 300 or process 400 described above until the media stream 102 finishes streaming (e.g., the user 112 reaches an end of a video, podcast, audiobook, etc.).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a processing device; and
   a memory device including instructions that are executable by the processing device for causing the processing device to perform operations comprising:
   applying a set playback speed as a rate at which a media stream is configured to be presented to a user;
   in response to applying the set playback speed to the media stream, determining that one or more interruptions of the media stream are occurring at the set playback speed;
   in response to determining that the one or more interruptions of the media stream are occurring, adjusting the set playback speed to a reduced playback speed to resolve the one or more interruptions;
   subsequent to resolving the one or more interruptions of the media stream, adjusting the reduced playback speed to an increased playback speed by applying a first increase step to the reduced playback speed;
   determining whether the increased playback speed is lower than the set playback speed; and
   in response to determining that the increased playback speed is lower than the set playback speed, applying a second increase step to the increased playback speed to present the media stream to the user at an updated playback speed.

2. The system of claim 1, wherein the operations further comprise:
- subsequent to applying the second increase step to the increased playback speed, determining whether the media stream is being continuously presented to the user at the updated playback speed, wherein the system is configured to decrease the updated playback speed in response to detecting the one or more interruptions of the media stream; and
- in response to determining that the increased playback speed is equal to or higher than the set playback speed, forgoing an adjustment to the increased playback speed.

3. The system of claim 1, wherein the operation of presenting the media stream to the user at the reduced playback speed comprises:
- determining a reduction step based on system resources available to present the media stream to the user, wherein the system resources include at least one of: i) network bandwidth or ii) hardware capabilities associated with the system; and
- applying the reduction step to the set playback speed of the media stream to present the media stream at the reduced playback speed.

4. The system of claim 1, wherein the operation of presenting the media stream to the user at the reduced playback speed comprises:
- obtaining a reduction step from a configuration file of the system, wherein the configuration file indicates a predefined reduction corresponding to the reduction step; and
- applying the predefined reduction as the reduction step to the set playback speed of the media stream to present the media stream at the reduced playback speed.

5. The system of claim 1, wherein the operations further comprise, subsequent to the operation of presenting the media stream to the user at the reduced playback speed:
- determining that the one or more interruptions of the media stream are resolved based on the media stream being continuously presented to the user at the reduced playback speed; and
- based on the reduced playback speed being lower than the set playback speed, presenting the media stream to the user at the increased playback speed.

6. The system of claim 5, wherein the operation of presenting the media stream to the user at the increased playback speed comprises:
- determining the first increase step based on system resources available to present the media stream to the user, wherein the system resources include at least one of: i) network bandwidth or ii) hardware capabilities associated with the system; and
- applying the first increase step to the reduced playback speed of the media stream to present the media stream at the increased playback speed.

7. The system of claim 5, wherein the operation of presenting the media stream to the user at the increased playback speed comprises:
- obtaining the first increase step from a configuration file of the system, wherein the configuration file indicates a predefined increase corresponding to the first increase step; and
- applying the predefined increase as the first increase step to the reduced playback speed of the media stream to present the media stream at the increased playback speed.

8. The system of claim 1, wherein the operations further comprise, subsequent to the operation of determining that the one or more interruptions of the media stream are occurring at the set playback speed:
- determining whether the set playback speed is lower than a default playback speed associated with the media stream;
- in response to determining that the set playback speed is higher than the default playback speed, applying a reduction step to the set playback speed to present the media stream at the reduced playback speed; and
- in response to determining that the set playback speed is equal to or lower than the default playback speed associated with the media stream, adjusting a bit rate of the media stream to resolve the one or more interruptions of the media stream.

9. A method comprising:
- applying, by one or more processing devices of a media playback system, a set playback speed as a rate at which a media stream is configured to be presented to a user;
- in response to applying the set playback speed to the media stream, determining, by the one or more processing devices, that one or more interruptions of the media stream are occurring at the set playback speed;
- in response to determining that the one or more interruptions of the media stream are occurring, adjusting, by the one or more processing devices, the set playback speed to a reduced playback speed to resolve the one or more interruptions;
- subsequent to resolving the one or more interruptions of the media stream, adjusting, by the one or more processing devices, the reduced playback speed to an increased playback speed by applying a first increase step to the reduced playback speed;
- determining, by the one or more processing devices, whether the increased playback speed is lower than the set playback speed; and
- in response to determining that the increased playback speed is lower than the set playback speed, applying, by the one or more processing devices, a second increase step to the increased playback speed to present the media stream to the user at an updated playback speed.

10. The method of claim 9, further comprising:
- subsequent to applying the second increase step to the increased playback speed, determining whether the media stream is being continuously presented to the user at the updated playback speed, wherein the media playback system is configured to decrease the updated playback speed in response to detecting the one or more interruptions of the media stream; and
- in response to determining that the increased playback speed is equal to or higher than the set playback speed, forgoing an adjustment to the increased playback speed.

11. The method of claim 9, wherein presenting the media stream to the user at the reduced playback speed comprises:
- determining a reduction step based on system resources available to present the media stream to the user, wherein the system resources include at least one of: i) network bandwidth or ii) hardware capabilities associated with the media playback system; and
- applying the reduction step to the set playback speed of the media stream to present the media stream at the reduced playback speed.

12. The method of claim 9, wherein presenting the media stream to the user at the reduced playback speed comprises:

obtaining a reduction step from a configuration file of the media playback system, wherein the configuration file indicates a predefined reduction corresponding to the reduction step; and applying the predefined reduction as the reduction step to the set playback speed of the media stream to present the media stream at the reduced playback speed.

13. The method of claim 9, further comprising, subsequent to presenting the media stream to the user at the reduced playback speed:

determining that the one or more interruptions of the media stream are resolved based on the media stream being continuously presented to the user at the reduced playback speed; and based on the reduced playback speed being lower than the set playback speed, presenting the media stream to the user at the increased playback speed.

14. The method of claim 13, wherein presenting the media stream to the user at the increased playback speed comprises:

determining the first increase step based on system resources available to present the media stream to the user, wherein the system resources include at least one of: i) network bandwidth or ii) hardware capabilities associated with the media playback system; and applying the first increase step to the reduced playback speed of the media stream to present the media stream at the increased playback speed.

15. The method of claim 13, wherein presenting the media stream to the user at the increased playback speed comprises:

obtaining the first increase step from a configuration file of the media playback system, wherein the configuration file indicates a predefined increase corresponding to the first increase step; and applying the predefined increase as the first increase step to the reduced playback speed of the media stream to present the media stream at the increased playback speed.

16. The method of claim 9, further comprising, subsequent to determining that the one or more interruptions of the media stream are occurring at the set playback speed:

determining whether the set playback speed is lower than a default playback speed of the media playback system;

in response to determining that the set playback speed is higher than the default playback speed, applying a reduction step to the set playback speed to present the media stream at the reduced playback speed; and in response to determining that the set playback speed is equal to or lower than the default playback speed of the media playback system, adjusting a bit rate of the media stream to resolve the one or more interruptions of the media stream.

17. A non-transitory computer-readable medium comprising program code executable by a processing device of a media playback system for causing the processing device to perform operations comprising:

applying a set playback speed as a rate at which a media stream is configured to be presented to a user;

in response to applying the set playback speed to the media stream, determining that one or more interruptions of the media stream are occurring at the set playback speed;

in response to determining that the one or more interruptions of the media stream are occurring, adjusting the set playback speed to a reduced playback speed to resolve the one or more interruptions;

subsequent to resolving the one or more interruptions of the media stream, adjusting the reduced playback speed to an increased playback speed by applying a first increase step to the reduced playback speed;

determining whether the increased playback speed is lower than the set playback speed; and in response to determining that the increased playback speed is lower than the set playback speed, applying a second increase step to the increased playback speed to present the media stream to the user at an updated playback speed.

18. The non-transitory computer-readable medium of claim 17, wherein the operations further comprise:

subsequent to applying the second increase step to the increased playback speed, determining whether the media stream is being continuously presented to the user at the updated playback speed, wherein the processing device is configured to decrease the updated playback speed in response to detecting the one or more interruptions of the media stream; and in response to determining that the increased playback speed is equal to or higher than the set playback speed, forgoing an adjustment to the increased playback speed.

19. The non-transitory computer-readable medium of claim 17, wherein the operation of presenting the media stream to the user at the reduced playback speed comprises:

determining a reduction step based on system resources available to present the media stream to the user, wherein the system resources include at least one of: i) network bandwidth or ii) hardware capabilities associated with the media playback system; and applying the reduction step to the set playback speed of the media stream to present the media stream at the reduced playback speed.

20. The non-transitory computer-readable medium of claim 17, wherein the operations further comprise, subsequent to the operation of presenting the media stream to the user at the reduced playback speed:

determining that the one or more interruptions of the media stream are resolved based on the media stream being continuously presented to the user at the reduced playback speed; and based on the reduced playback speed being lower than the set playback speed, presenting the media stream to the user at the increased playback speed.

* * * * *